(12) United States Patent
Beaumont

(10) Patent No.: US 7,913,062 B2
(45) Date of Patent: Mar. 22, 2011

(54) METHOD OF ROTATING DATA IN A PLURALITY OF PROCESSING ELEMENTS

(75) Inventor: Mark Beaumont, Reading (GB)

(73) Assignee: Micron Technology, Inc., Boise, ID (US)

( * ) Notice: Subject to any disclaimer, the term of this patent is extended or adjusted under 35 U.S.C. 154(b) by 498 days.

(21) Appl. No.: 10/689,390

(22) Filed: Oct. 20, 2003

(65) Prior Publication Data

US 2004/0220949 A1 Nov. 4, 2004

(30) Foreign Application Priority Data

Apr. 23, 2003 (GB) .................................. 0309194.9

(51) Int. Cl.
*G06F 15/76* (2006.01)
(52) U.S. Cl. ............................................ 712/17; 712/12
(58) Field of Classification Search .................. 382/297; 712/14, 17

See application file for complete search history.

(56) References Cited

U.S. PATENT DOCUMENTS

| | | | |
|---|---|---|---|
| 3,308,436 A | 3/1967 | Borck et al. | |
| 4,215,401 A | 7/1980 | Holsztynski et al. | |
| 4,816,993 A | 3/1989 | Takahashi | |
| 4,876,534 A | 10/1989 | Mead et al. | |
| 4,942,517 A | 7/1990 | Cok | |
| 4,992,933 A * | 2/1991 | Taylor | 712/22 |
| 5,081,700 A * | 1/1992 | Crozier | 345/658 |
| 5,111,192 A * | 5/1992 | Kadakia | 345/658 |
| 5,241,677 A | 8/1993 | Naganuma et al. | |
| 5,408,676 A | 4/1995 | Mori | |
| 5,444,701 A | 8/1995 | Cypher et al. | |
| 5,535,387 A | 7/1996 | Matsouka et al. | |
| 5,546,336 A | 8/1996 | Pechanek et al. | |
| 5,568,600 A * | 10/1996 | Kaba | 345/648 |
| 5,581,773 A | 12/1996 | Glover | |
| 5,630,129 A | 5/1997 | Wheat | |
| 5,644,517 A | 7/1997 | Ho | |
| 5,689,719 A | 11/1997 | Miura et al. | |
| 5,850,489 A | 12/1998 | Rich | |
| 5,892,517 A | 4/1999 | Rich | |
| 5,898,881 A | 4/1999 | Miura et al. | |
| 5,963,746 A | 10/1999 | Barker et al. | |
| 5,966,528 A | 10/1999 | Wilkinson et al. | |
| 6,023,753 A | 2/2000 | Pechanek et al. | |

(Continued)

FOREIGN PATENT DOCUMENTS

EP 0314277 A2 5/1989

(Continued)

OTHER PUBLICATIONS

Toffoli et al. "Three-Dimensional Rotations by Three Shears" Graphical Models and Image Processing vol. 59 Dec. 1997 revised reprint, pp. 89-96.*

(Continued)

*Primary Examiner* — Jacob Petranek
(74) *Attorney, Agent, or Firm* — Jones Day

(57) ABSTRACT

A method of rotating data in a plurality of processing elements comprises a plurality of shifting operations and a plurality of storing operations, with the shifting and storing operations coordinated to enable a three shears operation to be performed on the data. The plurality of storing operations is responsive to the processing element's positions.

16 Claims, 9 Drawing Sheets

U.S. PATENT DOCUMENTS

| | | | |
|---|---|---|---|
| 6,078,945 | A | 6/2000 | Hinsley |
| 6,185,667 | B1 | 2/2001 | Abercrombie et al. |
| 6,219,776 | B1 | 4/2001 | Pechanek et al. |
| 6,279,088 | B1 | 8/2001 | Elliot et al. |
| 6,292,822 | B1 | 9/2001 | Hardwick |
| 6,338,129 | B1 * | 1/2002 | Pechanek et al. ............. 712/11 |
| 6,404,439 | B1 | 6/2002 | Coulombe et al. |
| 6,421,772 | B1 * | 7/2002 | Maeda et al. ............. 712/11 |
| 6,430,618 | B1 | 8/2002 | Karger et al. |
| 6,728,862 | B1 | 4/2004 | Wilson |
| 6,754,801 | B1 | 6/2004 | Kirsch |
| 6,877,020 | B1 | 4/2005 | Bratt et al. |
| 6,968,447 | B1 | 11/2005 | Apisdorf et al. |
| 6,970,196 | B1 | 11/2005 | Ishikawa et al. |
| 2002/0133688 | A1 | 9/2002 | Lee et al. |
| 2003/0026237 | A1 | 2/2003 | Mohebbi et al. |
| 2003/0084081 | A1 | 5/2003 | Hanounik |
| 2004/0054870 | A1 | 3/2004 | Kirsch |

FOREIGN PATENT DOCUMENTS

| | | | |
|---|---|---|---|
| EP | 0375401 | A1 | 6/1990 |
| JP | 60028345 | A | 2/1985 |
| WO | WO 94/10638 | A1 | 5/1994 |
| WO | WO 96/36941 | | 11/1996 |
| WO | WO 01/90915 | A3 | 11/2001 |

OTHER PUBLICATIONS

Daehyun Kim, Mainak Chaudhuri, and Mark Heinrich, Leveraging Cache Coherence in Active Memory Systems, Proceedings of the 16th ACM Int'l Conference on Supercomputing, pp. 2-13, New York City, USA, Jun. 2002.

Mainak Chaudhuri, Daehyun Kim, and Mark Heinrich, Cache Coherence Protocol Design for Active Memory Systems, Proceedings of the 2002 Int'l Conference on Parallel and Distributed Processing Techniques and Applications, pp. 83-89, Las Vegas, USA, Jun. 2002.

Hanounik, et al.; Linear-Time Matrix Transpose Algorithms Using Vector Register File With Diagonal Registers; 2001; pp. 1-8.

Choi, et al.; Parallel Matrix Transpose Algorithms On Distributed Memory Concurrent Computers; 1993; pp. 1-20.

Huang, Han-Way; MC68HC12 An Introduction: Software and Hardware Interfacing; Jul. 1, 2002; Delmar Cengage Learning; 1 Edition; pp. 62, 63, 66.

* cited by examiner

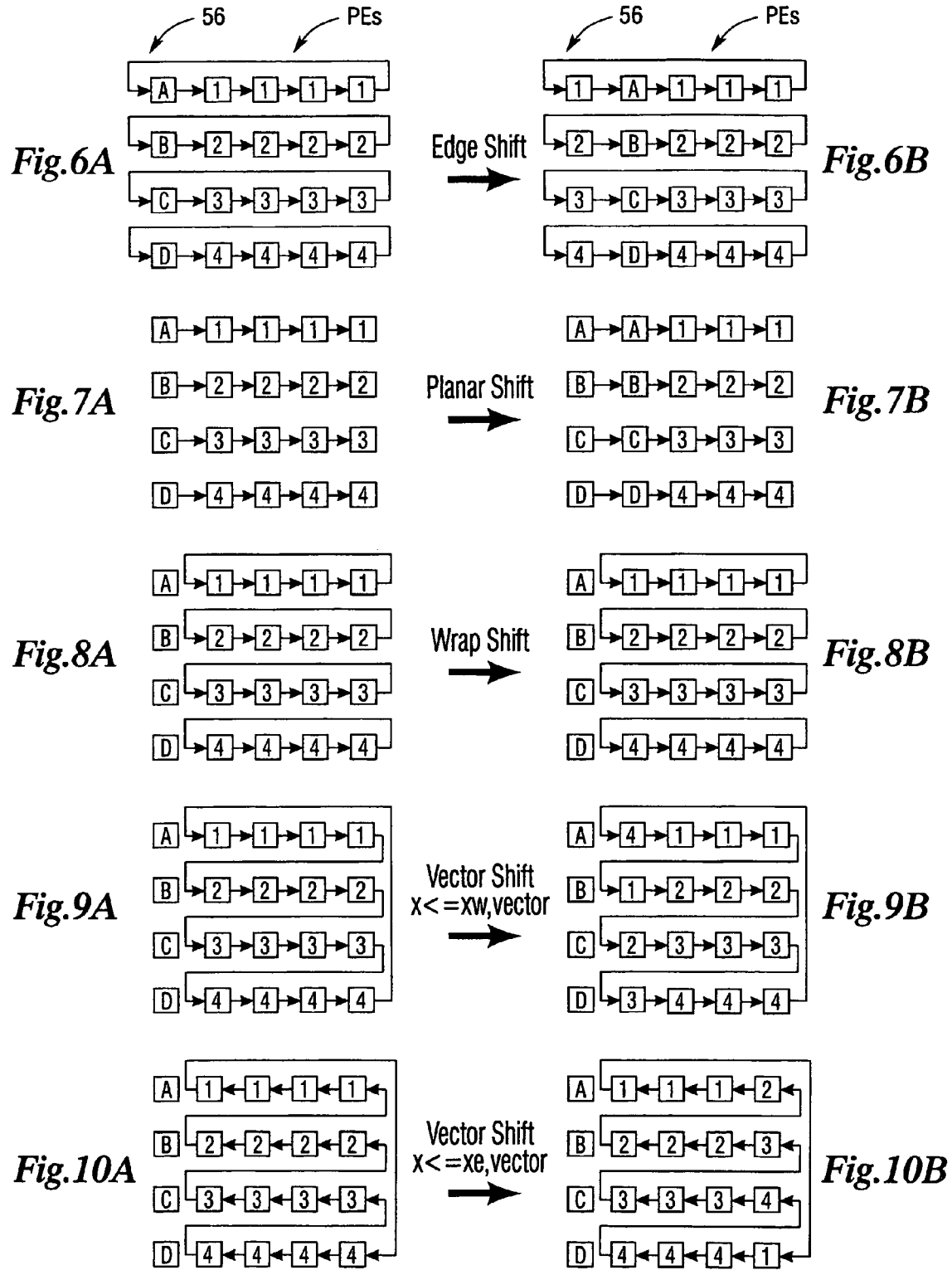

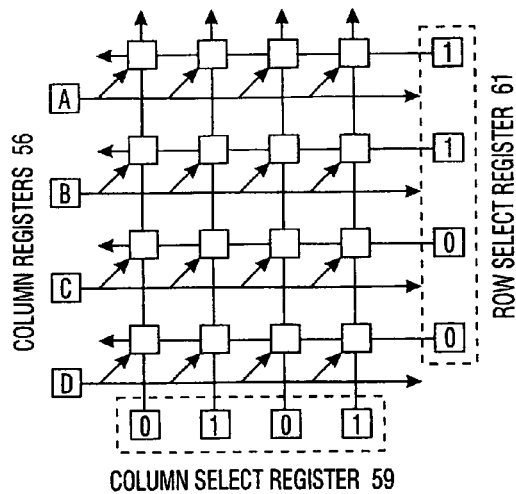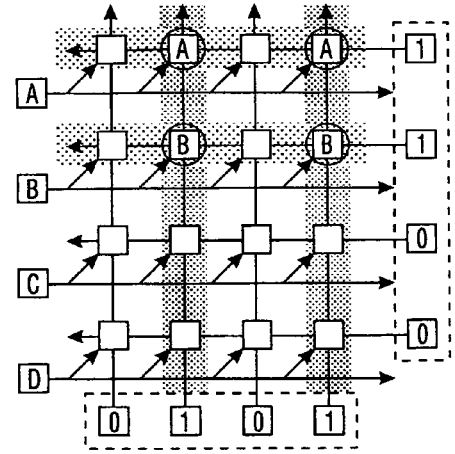
*Fig.11A*  *Fig.11B*
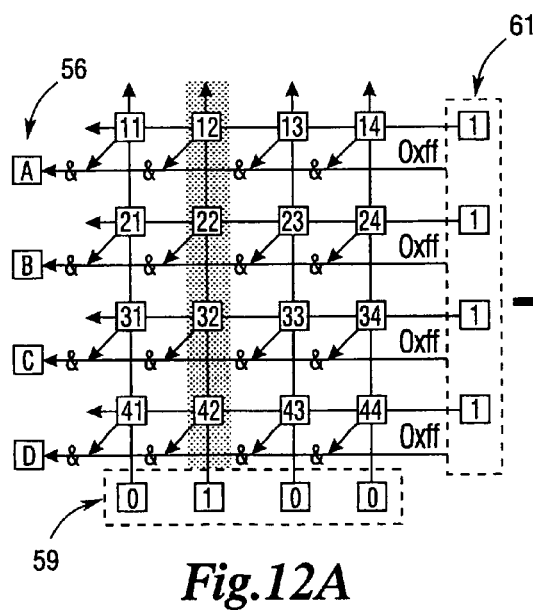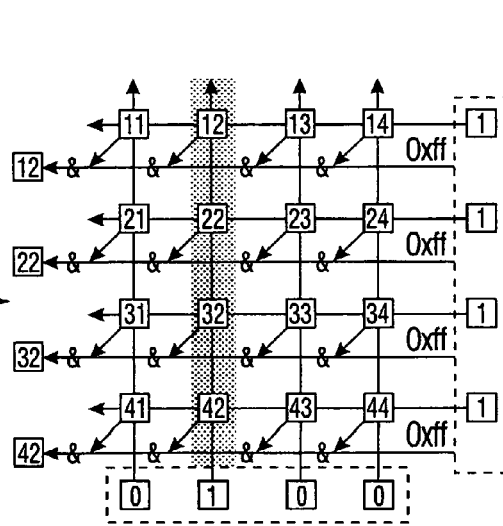
*Fig.12A*  *Fig.12B*

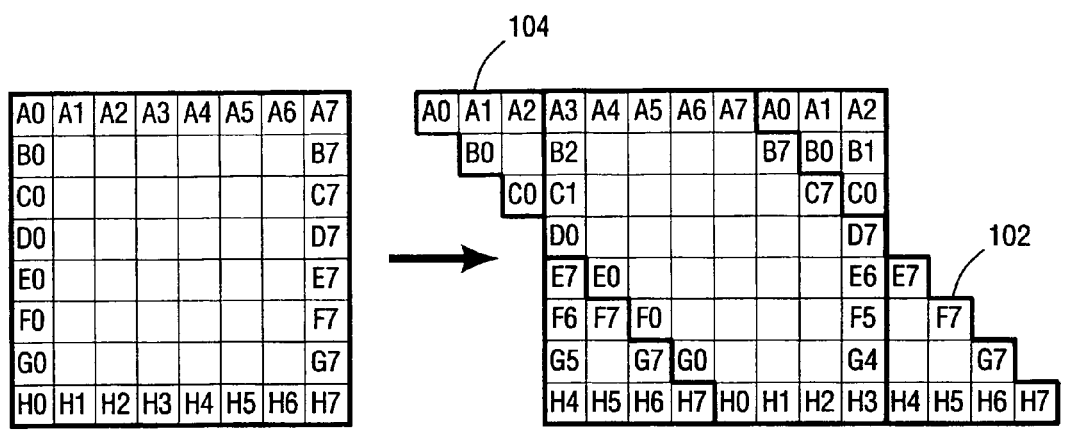
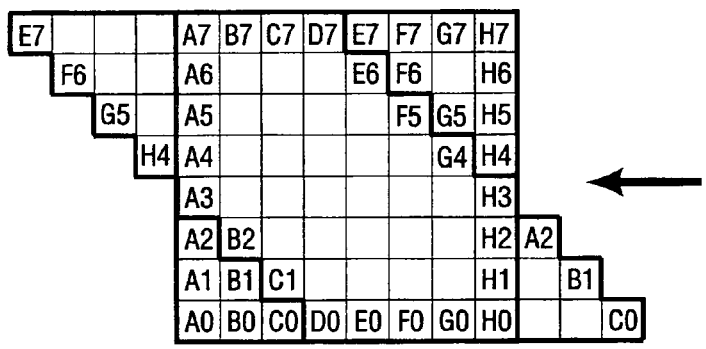
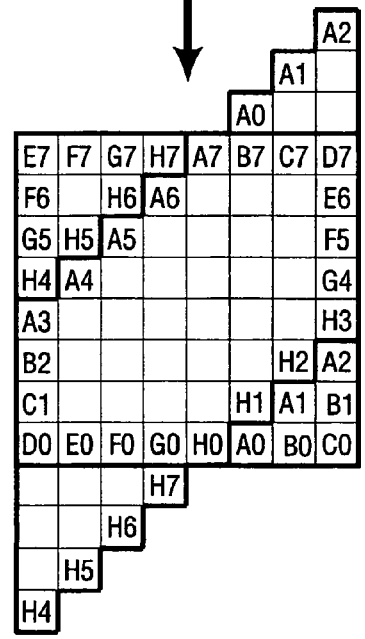
*Fig.16A*  *Fig.16B*  *Fig.16C*  *Fig.16D*

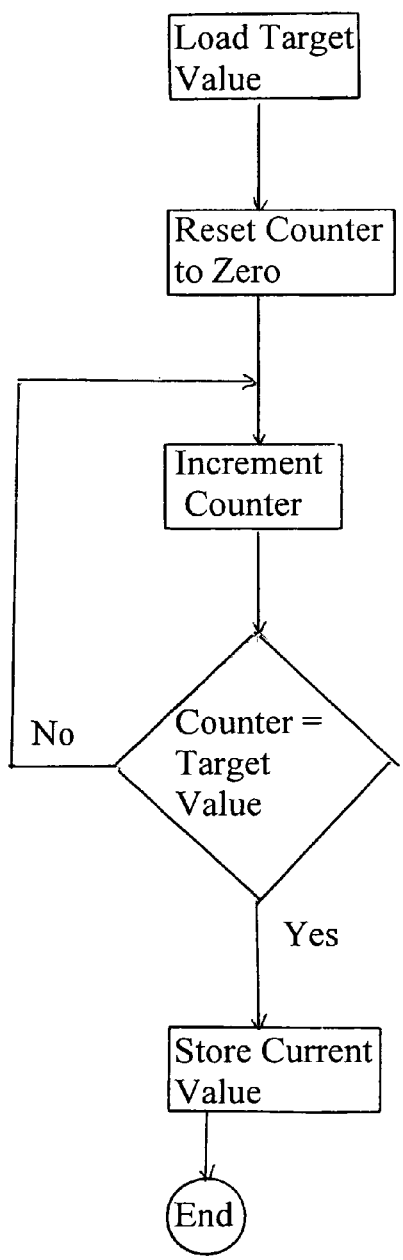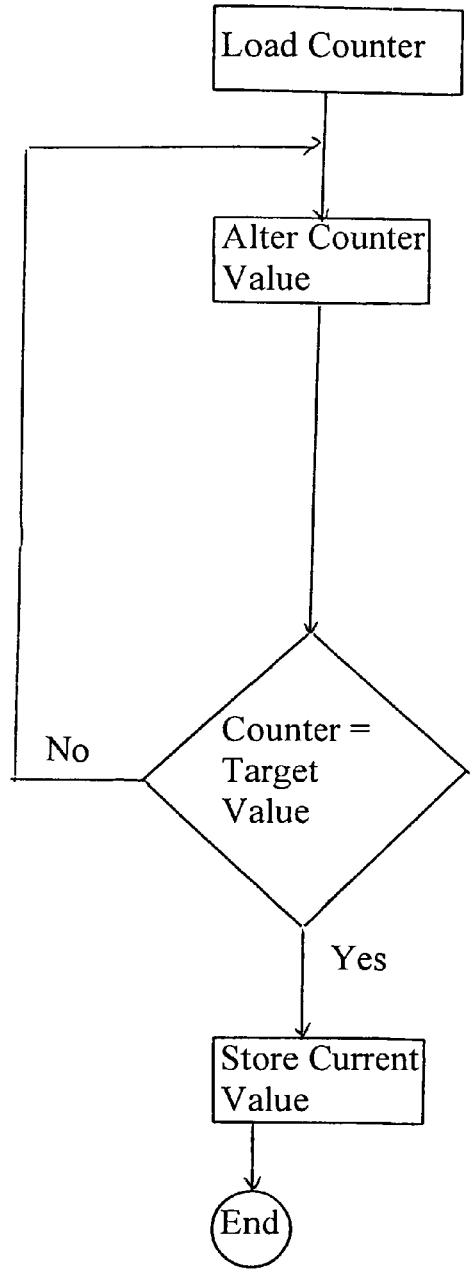
FIG. 17A
FIG. 17B

METHOD OF ROTATING DATA IN A PLURALITY OF PROCESSING ELEMENTS

CROSS-REFERENCE TO RELATED APPLICATIONS

The present application is related to the following applications: U.S. application Ser. No. 10/689,366 entitled Method for Manipulating Data in a Group of Processing Elements to Perform a Reflection of the Data; U.S. application Ser. No. 10/689,257 entitled Method for Manipulating Data in a Group of Processing Elements to Transpose the Data; U.S. application Ser. No. 10/689,300 entitled Method for Manipulating the Data in a Group of Processing Elements to Transpose the Data Using a Memory Stack; and U.S. application Ser. No. 10/689,380 entitled Method of Manipulating Data in a Group of Processing Elements, all filed concurrently herewith.

BACKGROUND OF INVENTION

The present invention relates generally to parallel processing and, more specifically, to parallel processing in an active memory device or single instruction, multiple data (SIMD) computer.

A single, synchronous dynamic random access memory (SDRAM) chip has an internal data bandwidth of greater than 200 G bits/s and a very wide data bus (thousands of bits). That vast data bandwidth provides an opportunity for high performance. Active memories represent one effort to use that vast data bandwidth to improve performance.

An active memory is a memory device which has a built in processing resource. One of the principal advantages of active memory is that data is processed close to where it is stored. Usually the processing resource is a highly parallel computer system which has processing power to exploit the very high data bandwidths available inside a memory system. An example of an active memory system is illustrated in FIG. 1.

In FIG. 1, a main memory 10 appears as a traditional memory to a CPU 12 except that the main memory 10, by virtue of memory processors 14, can be instructed to perform tasks on its data without the data being transferred to the CPU 12 or to any other part of the system over a system bus 16. The memory processors 14 are a processing resource distributed throughout the main memory 10. The processing resource is most often partitioned into many similar processing elements (PEs). The PEs are usually simple and operate in parallel. In such a system, the work of the CPU 12 is reduced to various operating system tasks such as scheduling. A substantial portion of the data processing is performed within the main memory 10 by virtue of the memory processors 14.

Active memory systems have a long history. The earliest systems were built in the 1960's. However, until the advent of integrated logic and current DRAM technologies, active memory computers were always expensive, special machines, excluded from mass-market applications. For active memory to be effective, the organization of data in the PE array is an important consideration. Hence, the provision of an efficient mechanism for moving data from one PE to another is an important consideration in the design of the PE array.

In the past, several different methods of connecting PEs have been used in a variety of geometric arrangements including hypercubes, butterfly networks, one-dimensional strings/rings and two-dimensional meshes. In a two-dimensional mesh or arrays, the PEs are arranged in rows and columns, with each PE being connected to its four neighboring PEs in the rows above and below and columns to either side which are sometimes referred to as north, south, east and west connections.

Disclosed in G.B. Patent Application Serial No. GB02215630, entitled Control of Processing Elements in Parallel Processors, filed Sep. 17, 2002 is an arrangement in which a column select line and a row select line can be used to identify processing elements which are active, e.g. capable of transmitting or receiving data. The ability to use a row select signal and a column select signal to identify active PEs provides a substantial advantage over the art in that it enables data to be moved through the array of PEs in a nonuniform manor. However, the need still exists for enabling PEs within the array to work independently of its neighboring PEs even though each PE within the array has received the same instruction.

SUMMARY OF THE INVENTION

The present invention is directed to a method of rotating data in a plurality of processing elements comprising a plurality of shifting operations and a plurality of storing operations, with the shifting and storing operations coordinated to enable a three shears operation to be performed on the data. The plurality of storing operations is responsive to the processing element's positions.

According to one embodiment of the present invention, a method for rotating data in a plurality of processing elements is comprised of a first shifting of a first plurality of data in a first direction and a first storing of data by a first plurality of the processing elements in response to the first shifting and the positions of the first plurality of processing elements. A second shifting of a second plurality of data in a second direction perpendicular to the first direction is followed by a second storing of data by a second plurality of processing elements in response to the second shifting and the positions of the second plurality of processing elements. A third shifting of a third plurality of data in a third direction opposite to the first direction is similarly followed by a third storing of data by a third plurality of processing elements in response to the third shifting and the positions of the third plurality of processing elements.

The present invention is directed to a method of executing a three shears method of rotating a matrix of data by 90° in an efficient manner. The present invention contemplates hardware, e.g. memory containing an ordered set of instructions, for carrying out the disclosed methods. Those advantages and benefits, and others, will be apparent from the description of the invention below.

BRIEF DESCRIPTION OF THE DRAWINGS

For the present invention to be easily understood and readily practiced, the present invention will be described in conjunction with an exemplary embodiment, for purposes of illustration and not limitation, in conjunction with the following figures wherein:

FIGS. 6A and 6B illustrate one example of an edge shift;

FIGS. 7A and 7B illustrate one example of a planar shift;

FIGS. 8A and 8B illustrate one example of a wrap shift;

FIGS. 9A and 9B illustrate one example of a vector shift;

FIGS. 10A and 10B illustrate another example of a vector shift;

FIGS. 11A and 11B illustrate one example of a data broadcast from the edge registers in which a row and column select function enabled;

FIGS. 12A and 12B illustrate one example of a broadcatch in which only one column is selected;

FIGS. 15A-15D illustrate an embodiment of the present invention;

FIGS. 16A-16D illustrate another embodiment of the present invention; and

FIGS. 17A and 17B illustrate flow charts of processes for shifting and storing data based on a count.

DESCRIPTION OF THE INVENTION

Figure 2:
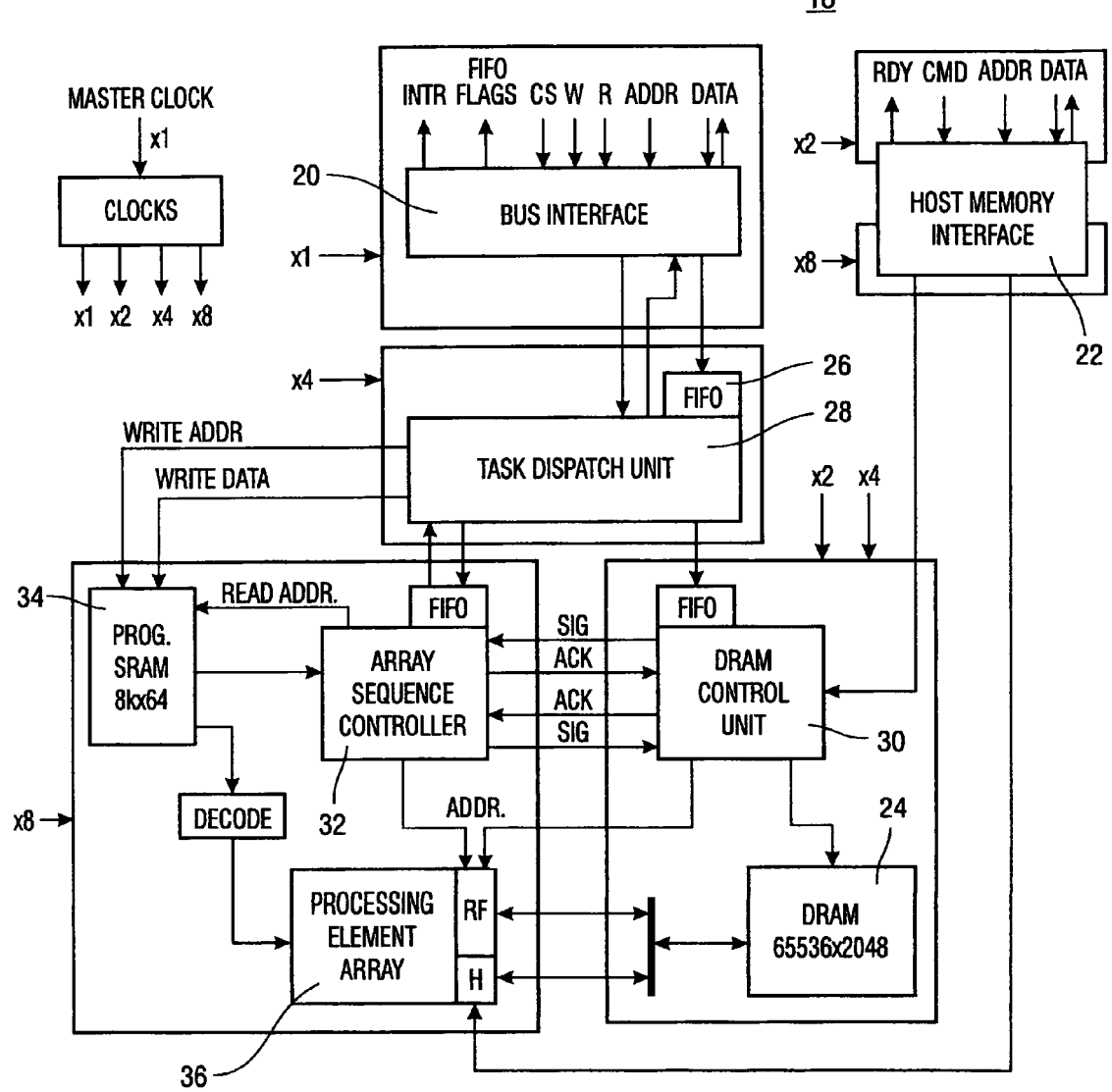
FIG. 2 is a high level block diagram of one example of an active memory on which the methods of the present invention may be practiced.

Illustrated in FIG. 2 is a high level block diagram of one example of an active memory device 18 on which the methods of the present invention may be practiced. The reader should understand that the methods of the present invention are generally applicable to any group of processing elements having the necessary physical connections between PEs to enable the manipulation of data as required by the methods. The hardware illustrated in FIG. 2 is disclosed for purposes of illustration and not limitation. Furthermore, those of ordinary skill in the art will recognize that the block diagram of FIG. 2 is an overview of an active memory device with a number of components known in the art being omitted for purposes of clarity.

Figure 1:
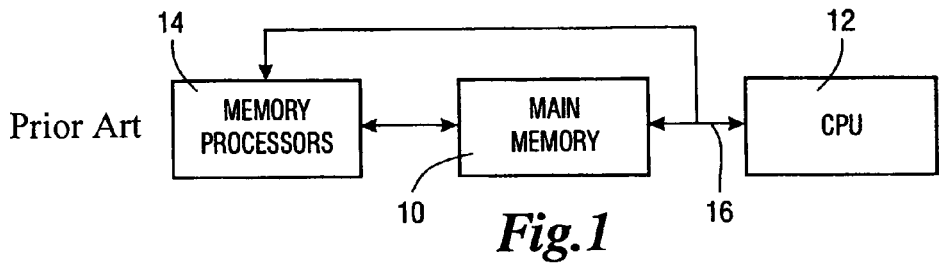
FIG. 1 is a block diagram illustrating the concept of active memory.

The active memory device 18 of FIG. 2 is intended to be deployed in a computer system as a slave device, where a host processor (e.g. CPU 12 in FIG. 1) sends commands to the active memory device 18 to initiate processing within the active memory device 18. A complete processing operation, i.e., data movement and processing, in the active memory device 18 will usually consist of a sequence of many commands from the host to the active memory device 18.

The active memory device 18 may have two interfaces, a bus interface 20 and a host memory interface 22, for interfacing with the host or other external logic for the purposes of data input, data output and for control. The host memory interface 22 (data input/output ports) of the active memory device 18 is similar in its operation to the interface of a synchronous DRAM. To access data within a DRAM array 24, the host must first activate a page of data. Each page may contain 1024 bytes of data and there may be 16384 pages in all. Once a page has been activated, it can be written and read through the, for example, 32 bit data input/output ports. The data in the DRAM array 24 is updated when the page is deactivated.

In the active memory device 18 the input and output ports are separate, or they may be combined into a single bi-directional input/output port. A control output may be provided to control a bi-directional buffer servicing the single bi-directional input/output port.

The host memory interface 22 may operate at twice the frequency of the master input clock. A copy of the 2× clock may be driven off-chip as a timing reference. Unlike a traditional DRAM, the access time for the host memory interface 22 port takes a variable number of cycles to complete an internal operation, such as an activate or deactivate. A ready signal (rdy) is provided to allow the host to detect when the command has been completed.

The control or command port (cmd) may be a straightforward 32 bit synchronous write/read interface. Writes place both data and the corresponding address into a FIFO 26 of a task dispatch unit 28, which holds the commands until they are executed in the order they were issued. This arrangement allows a burst of commands to be written to the active memory device 18 suiting the burst operation of many peripheral buses. Reads may operate directly.

The command port is also synchronous, running at the same frequency as the master input clock. Similarly to the host memory interface 22 ports, the clock may be driven out as a timing reference.

In addition to the two address-mapped ports, the active memory device 18 has an interrupt output (intr) which is used to alert its host to various different conditions.

Internal control in the active memory device 18 is handled by three processors. The task dispatch unit 28 (mentioned above) receives commands from the command port, interprets them and passes them on to the other two processors, a DRAM control unit 30 and an array sequence controller 32. The task dispatch unit 28 also maintains the addresses for operand placement in an array processor register file (RF) and enables access to on-chip resources such as a program memory 34.

The DRAM control unit 30 controls the DRAM array 24. The DRAM control unit 30 arbitrates between requests for DRAM array 24 access from the host through host memory access registers (H) and through the host memory interface 22. The DRAM control unit 30 also schedules DRAM array 24 refreshes.

The array sequence controller 32 controls an array or two dimensional mesh of PEs 36. The sequence controller 32 also executes a program from the program memory 34 and broadcasts control signals into the array of PEs 36. The DRAM control unit 30 and array sequence controller 32 may have a synchronization mechanism, whereby they can link the execution of tasks in either processor.

The active memory device 18 may contain, according to one embodiment, sixteen 64 k×128 eDRAM cores. Each eDRAM core is closely connected to an array of sixteen PEs, making 256(16×16) PEs in all.

Figure 3:
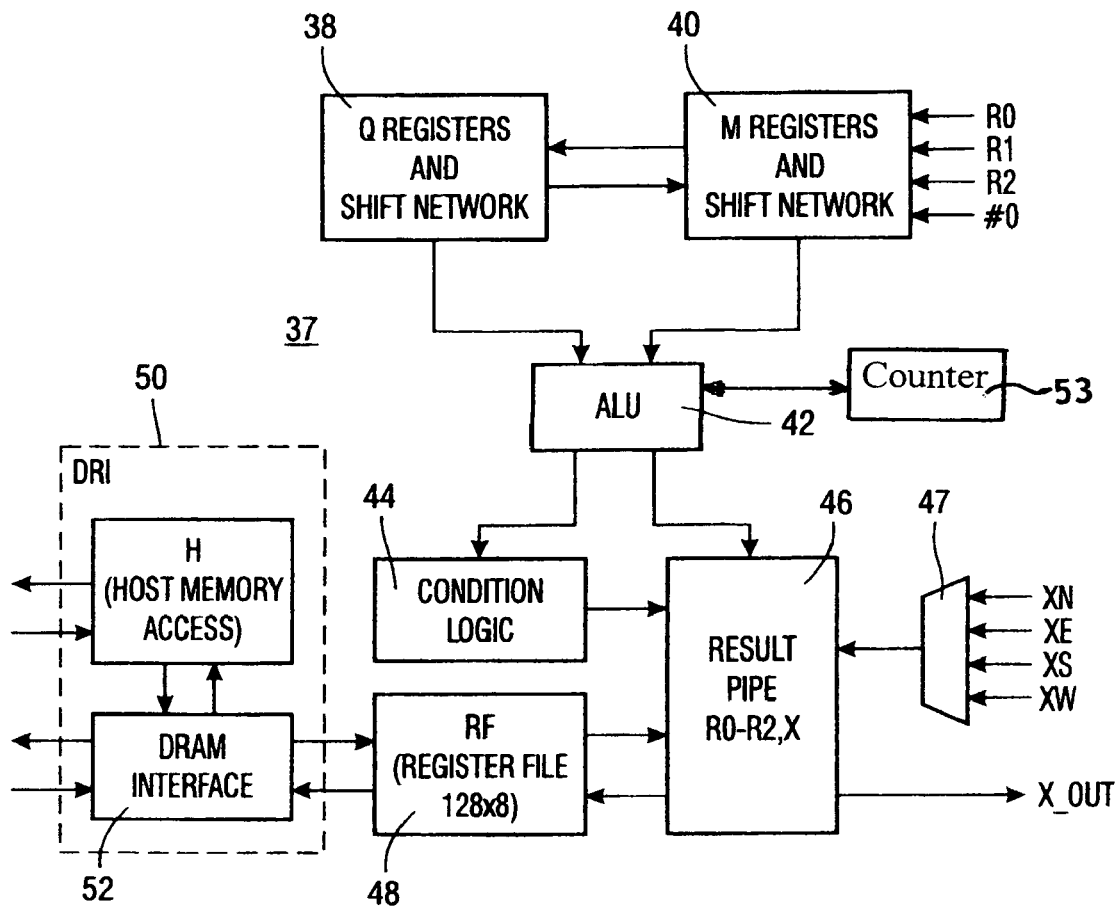
FIG. 3 is a high level block diagram of one example of a PE.

FIG. 3 is a high level block diagram of one example of a PE 37. The PE 37 is comprised of a set of Q registers and a shift network 38 which interact with a set of M registers and another shift register 40. One of the sets of registers and shift network 38, 40 receives inputs from various registers, such as register R0, R1, R2 and 0. The output of the registers and shift networks 38, 40 is input to an arithmetic logic unit (ALU) 42. The ALU 42 is capable of performing various arithmetic functions on its input such as addition, subtraction, etc. as is known. The ALU 42 is in communication with condition logic 44 and a result pipe 46.

The result pipe 46 is a series of interconnected registers R0, R1, R2 and a neighborhood connection register X, which may be used to output a final value. The result pipe 46 also receives through a multiplexer 47 data in the form of an output signal X from its four neighbors, one to the north (XN), one to the east (XE), one to the south (XS) and one to the west (XW). If the PE 37 happens to be located on an edge of an array, then it may be receiving data from an edge register or a PE in the same row or column, but on an opposite edge, as will be described in greater detail below.

The result pipe 46 is in communication with a register file (RF) 48 which in turn is in communication with an interface 50. The interface 50 may include a DRAM interface 52 as well as access to the host memory access registers (H).

The reader should recognize that the PE 37 illustrated in FIG. 3 is exemplary only and is not intended to limit the present invention. For example, the number and location of registers and shift networks may vary, the complexity of the ALU 42 and condition logic 44 may vary, the number of registers and interconnection of registers in the result pipe 46, the size and number of register files, and connection to neighboring PEs as well as other logic may be varied while remaining within the scope of the present invention. The particular architecture illustrated in FIG. 3 was selected to provide a rich register set to enable fairly complex multi-byte operations to be kept within the PE as much as possible.

For example, the Q registers and shift network 38 allow for data shifting within the 32 bits of the Q register to the left (most significant direction) one, two, four or eight places and eight places to the right as well as for merging data back into a floating point format. The M registers and shift network 40 allow for data shifting within the 32 bits of the M register to the right (least significant direction) one, two, four or eight places and for demerging data from floating point into a signed magnitude plus exponent format. The result from the ALU 42 can be loaded into register R0 while the input from the register file 48 can be loaded into either register R1 or register R2. The neighborhood connection register X can be used as a flexible member of the result pipeline allowing a pipeline length of up to four to be programmed within the PE 37. The X register can be loaded from the R0, R1 or R2 registers, or from the neighborhood interconnection input (the X register of a neighboring PE). The output of the X register can be fed back into the result pipeline at R1 or R2. The register file 48 may be implemented as a 128 entry by 8 bit register file implemented as a synchronous static RAM.

The DRAM interface 52 may contain two registers, a RAM IN register and a RAM OUT register. Input from the DRAM 24 of FIG. 2 may be held in the RAM IN register while output to the DRAM 24 is held in the RAM OUT register. The RAM IN and RAM OUT registers may reside in the clock domain of the DRAM 24 which typically uses a slower or divided clock derived from the same source as the clock used for the PE array 36. The RAM IN and RAM OUT registers may be controlled directly from the DRAM control unit 30 and are not visible to the programmer. Data can be transferred into and out of the register file 48 using stolen cycles. Data can also be transferred to/from the host memory access registers (H) without stealing cycles from processing in the PE 37.

Eight host memory access registers (H) may be provided which allows for a short burst of four or eight bytes to be transferred into or out of the DRAM 24 for host access. Those registers may be multiplexed and be visible from the host memory interface 22 (see FIG. 1) as a page of data. More details about the PEs may be found in G.B. Patent Application No. 021562.2 entitled Host Memory Interface for a Parallel Processor and filed Sep. 17, 2002, which is hereby incorporated by reference.

Figure 4:
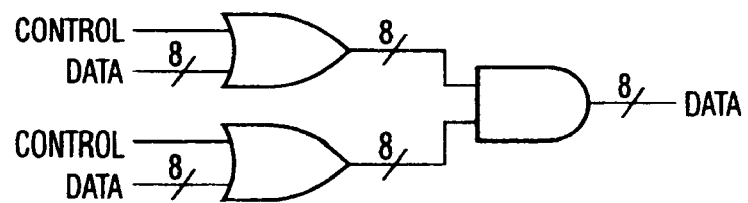
FIG. 4 is a diagram illustrating one type of logic circuit that may be used to interconnect the PE illustrated in FIG. 3 to other PEs.

FIG. 4 is a diagram illustrating one type of logic circuit that may be used to interconnect PEs of the type illustrated in FIG. 3. The reader will understand that many types of logic circuits may be used to interconnect PEs depending upon the functions to be performed. Using the logic circuit of FIG. 4 to interconnect PEs may result in an array of PEs 36 of the type illustrated in FIG. 5.

Figure 5:
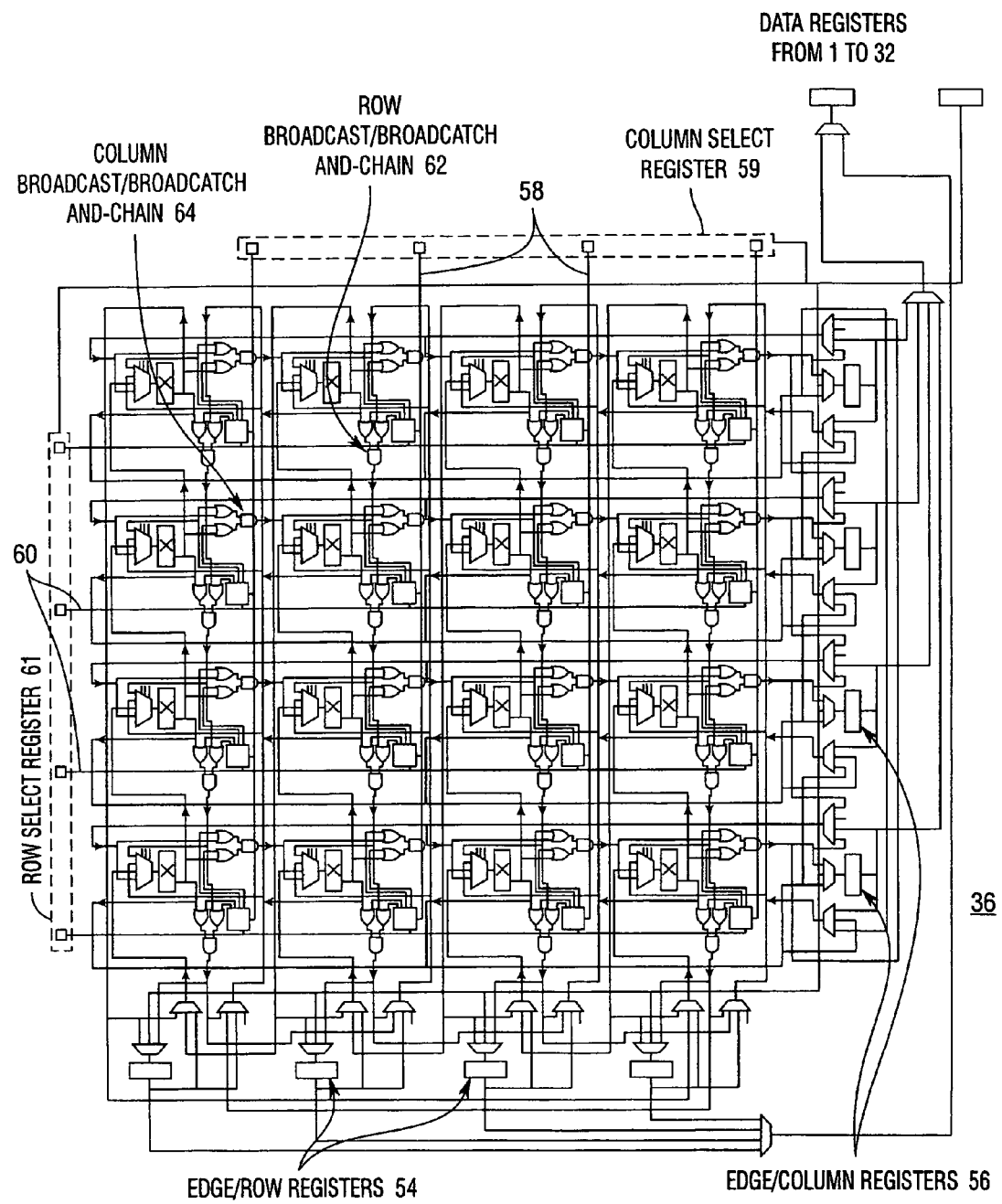
FIG. 5 illustrates one method of interconnecting PEs to form an array of PEs.

Turning now to FIG. 5, the X register within the result pipe 46 of each PE is driven out as, for example, an eight bit wide X output. Eight bits has been chosen in connection with this architecture as the data width for the PE-PE interconnect to keep a balance between the data movement performance of the array and the improved computational performance. Other sizes of interconnects may be used. The X output is connected to the neighboring inputs of each PE's closest neighbors in the north and west directions. To the south and east, the X output is combined with the input from the opposite direction and driven out to the neighboring PE.

At the edges of the array 36, the out-of-array connection is selected though a multiplexer to be either the output from the opposite side of the array or an edge/row register 54 or an edge/col. register 56. The edge registers 54, 56 can be loaded from the array output or from the controller data bus. A data shift in the array can be performed by loading the X register from one of the four neighboring directions. The contents of the X register can be conditionally loaded on the AND gate of the row select and column select signals which intersect at each PE. When the contents of the X register is conditionally loaded, the edge registers 54, 56 are also loaded conditionally depending on the value of the select line which runs in the same direction. Hence, an edge/row register 54 is loaded if the column select for that column is set to 1 and an edge/col register 56 is set if the row select is set to 1. The reader desiring more information about the hardware configuration illustrated in FIG. 5 is directed to G.B. Patent Application GB02215 630, entitled Control of Processing Elements in Parallel Processors filed Sep. 17, 2002, which is hereby incorporated by reference.

With the hardware previously described, a number of shifting operations may be performed as illustrated in FIGS. 6A, 6B through 10A, 10B. In FIG. 6A and 6B, an edge shift is illustrated. In the edge shift, the edge/col registers 56 are active as the data is shifted left to right (west to east) as shown in FIGS. 6A, 6B. The reader will recognize that an edge shift may be performed in the other direction, right to left (east to west). Alternatively, edge shifts may be performed by using the edge/row registers 54 in a north to south or south to north direction.

Illustrated in FIGS. 7A, 7B is a planer shift. In the planer shift there is no wrap around from the edge of the array. The reader will recognize that in addition to the planer shift illustrated in FIGS. 7A, 7B, planer shifts from east to west, north to south, and south to north may also be performed.

Illustrated in FIGS. 8A, 8B is a wrap shift. In the wrap shift, the edge/col registers 56 do not participate. Additionally, wrap shifts from east to west, north to south and south to north may be performed.

Illustrated in FIGS. 9A, 9B is a vector shift. Again, the edge/col registers 56 do not participate. Furthermore, the output of the PE in the bottom right corner of the array wraps to the input of the PE in the upper left corner of the array. In FIGS. 10A and 10B, a vector shift in the direction opposite to the direction of FIGS. 9A, 9B is illustrated. The reader will recognize that vector shifts from north to south and south to north may also be performed.

Returning to FIG. 5, the PE-PE interconnect may also provide a broadcast and broadcatch network. Connections or buses 58 extend north to south from a column select register 59 and connections or buses 60 extend west to east from a row select register 61. Also provided is row broadcast/broadcatch AND chain 62 and a column broadcast/broadcatch AND chain When used for data broadcast or broadcatch, these connections (column buses 58 and row buses 60) act as if driven by open drain drivers; the value on any bit is the wire-AND of all the drivers outputs. Three control signals (broadcatch, broadcast and intercast) determine the direction of the buses as follows:

If broadcatch is set to 1, any PE for which the corresponding bits of the row select register 61 and column select register 59 are both set will drive both the row buses 60 and the column buses 58. Note that if no PEs in a row or column drive the bus, the edge register at the end of that row or column will be loaded with 0×FF.

If broadcast is set to 1, the row bus 60 is driven from the row select register 61 and the column bus 58 is driven from the column select register 59 and any PE for which the corresponding bits of the row select register 61 and column select register 59 are both set will be loaded from one of the row or column inputs, according to which is selected.

If intercast is set to 1, any PE in which its A register is 1 will drive its output onto its row bus 60 and column bus 58 and any PE for which the corresponding bits of the row select register 61 and column select register 59 are both set will be loaded from one of the row buses 60 or column buses 58, according to which is selected.

With the aforementioned connections, a number of operations are possible, some of which are illustrated in FIGS. 11A, 11B through 14A, 14B.

In FIGS. 11A, 11B, data is broadcast from edge/col registers 56 with the column select register 59 and row select register 61 set as illustrated in FIG. 11A. As a result, data is latched in the PEs as shown in FIG. 11B in which four PEs are active, and the remainder of the PEs in the array are inactive.

In FIGS. 12A, 12B, a broadcatch instruction is illustrated in which one column is selected by setting the value for that column's bus 58 to 1. In this broadcatch-column operation, only those edge/col. registers 56 for which the row select register 61 bits are set, will be loaded. Similarly, in a broadcatch-row operation (not shown), only those row/edge registers 54 for which the corresponding column select register 59 bits are set, will be loaded.

Figure 13A:
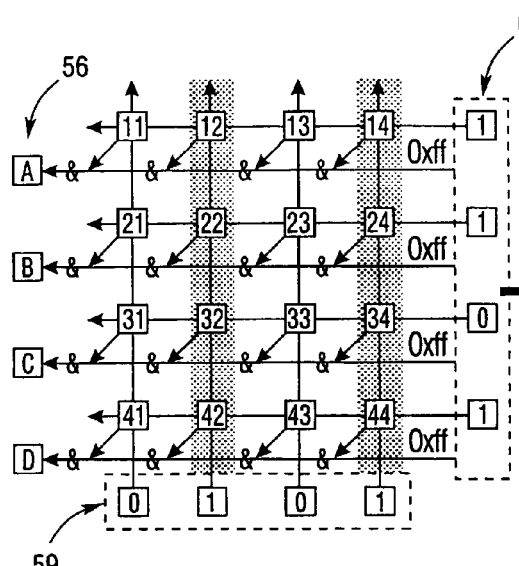
FIGS. 13A and 13B illustrate one example of selected edge registers being loaded with the AND of selected columns.
Figure 13B:
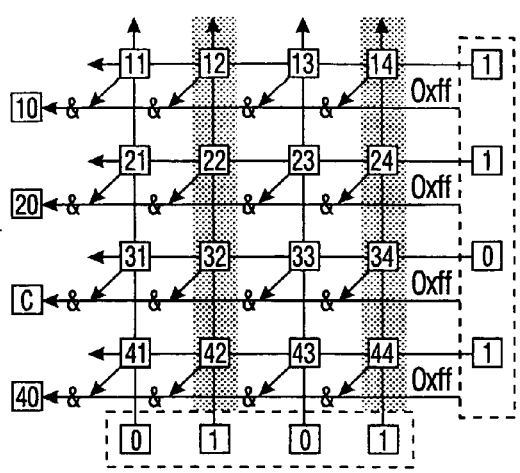

FIGS. 13A, 13B illustrate a broad catch instruction. In the illustrated example, the column select register 59 and row select register 61 are used to select the PEs whose values will be AND'ed together and loaded in the corresponding edge/col registers 56. In FIGS. 13A, 13B, the column edge registers 56 are loaded with the AND of selected columns, except where the row select is 0.

Figure 14A:
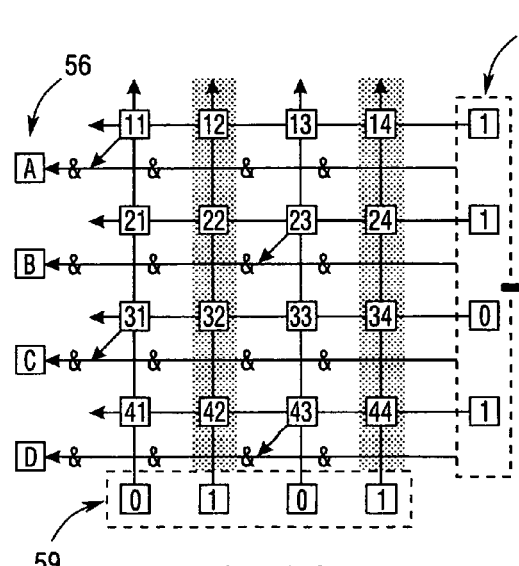
FIGS. 14A and 14B illustrate another example of a data broadcast.
Figure 14B:
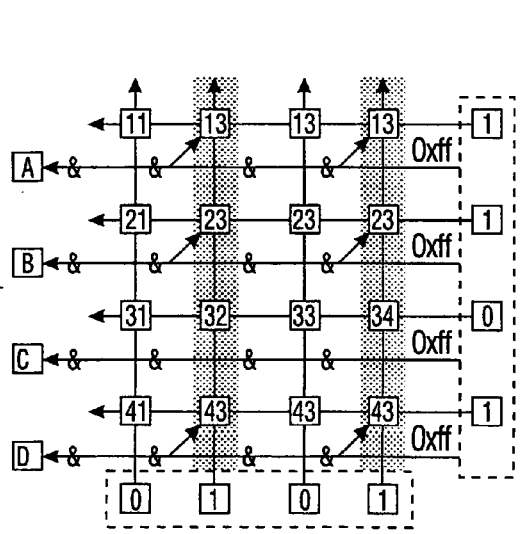

In FIGS. 14A, 14B, an example of an intercast operation is illustrated. In an intercast operation, PEs which drive onto the row buses 60 and column buses 58 are determined by each PE's A register value. The PEs which are loaded are determined by the row and column selects, just like for a broadcast. In FIG. 14A, data is broadcast from the X registers of those PEs where A equals 1 while in FIG. 14B, the column select register 59 and row select register 61 together activate those PEs into which data will be written.

Using the aforementioned instructions or operations, a group of instructions may be combined into an instruction set for manipulating data within the array 36 of PEs. The instruction set may include a single instruction or operation or a combination of instructions. Each individual instruction is carried out though a series of shifts.

In operation, an input matrix of data is placed on the shift network, and moved around by using a combination of north, south, east and west shifts. In addition, the column select register 59 and row select register 61 may be used to determine which of the PEs is active. The exact combination of active PEs, instructions, and direction in which the instruction (shift) is performed will depend upon the particular array manipulation required. As the instructions are executed and the shifting proceeds, each PE will be presented with different array values. For example, if a wrap shift is performed a number of times equal to the number of PEs in a row, each PE in the row will see every value held by all of the other PEs in the row.

A PE can conditionally select any of the values it sees as its final output value by conditionally loading that value, which is representative of an output result matrix. However, only one value, the desired result, is loaded.

All X values are passed through the PE; the required output value is conditionally loaded once it has arrived in the PE. The conditional loading can be done in various ways. e.g. by using any PE registers except X, R1, or R2. An example is shown below.

| Clock Cycle | PE C + 0 | PE C + 1 | PE C + 2 | PE C + 3 |
|---|---|---|---|---|
| T + 0 | X <= xe(east) ⇓ | ⇐ X <= xe ⇓ | ⇐ X <= xe ⇓ | ⇐ X <= xe ⇓ |
| T + 1 | R1 <= X ⇓ | R1 <= X ⇓ | R1 <= X ⇓ | R1 <= X ⇓ |
| T + 2 | <cond>?R0 <= R1 | <cond>?R0 <= R1 | <cond>?R0 <= R1 | <cond>?R0 <= R1 |

At time T+0: The X register reads data form the X register on the PE to the East. This shifts data to the left (or West).

At time T+1: The R1 register unconditionally reads the data off the shift network (X register)

At time T+2: The R0 register conditionally loads the data from R1. (i.e. if <cond>=1).

The timing of the loading is achieved by maintaining a current count in a local counter 53 illustrated in FIG. 3, which is typically implemented in software. In one embodiment, the local counter 53 is set to an initial value. The local counter 53 can be set in a variety of ways, including loading the counter with the initial value or calculating the initial value locally based on the processing element's location in the matrix (or array) and the function being performed on the data. Thereafter, at certain points in the shifting process, the counter is decremented. For example, the counter may be decremented once for each shift that occurs, or may be decremented once per n clock cycles where n clock cycles equals one shift. As stated, the initial value of the counter depends on its position in the matrix or array and is given by the general function f (Row_Index, Col_Index), where the exact form of f( ) will depend on the particular array manipulation required. When the counter reaches a non-positive value (i.e., zero or negative) the PE selects the data to be loaded into the output matrix.

Other ways of achieving the same result include, as shown in FIG. 17A, resetting the counter to zero and loading each PE with a target value. Thereafter, the counter is incremented producing a current count. When the current count equals the target value, the data value is selected as the final output value to be loaded into the output matrix. Generally, as shown in FIG. 17B, a counter is set to a first known value. Then, at certain programmable points in the algorithm, the value of the counter may be altered, up or down, by a programmable amount. Storing occurs when a current count in the counter hits a pre-defined target value.

By using the method of the present invention, PEs within a group of PEs can be individually controlled as to the output value which the PE selects for output into the final matrix. Thus, although all of the PEs are responding to the same command, e.g., an east to west wrap shift, each of the PEs is capable of selecting different data at different points during the execution of the instruction thereby enabling various types of data manipulations, e.g., transpose, reflection. Furthermore, by determining which PEs are active, additional flexibility is provided so that subsets of data can be manipulated.

Figures 15A, 15B, 15C, 15D:
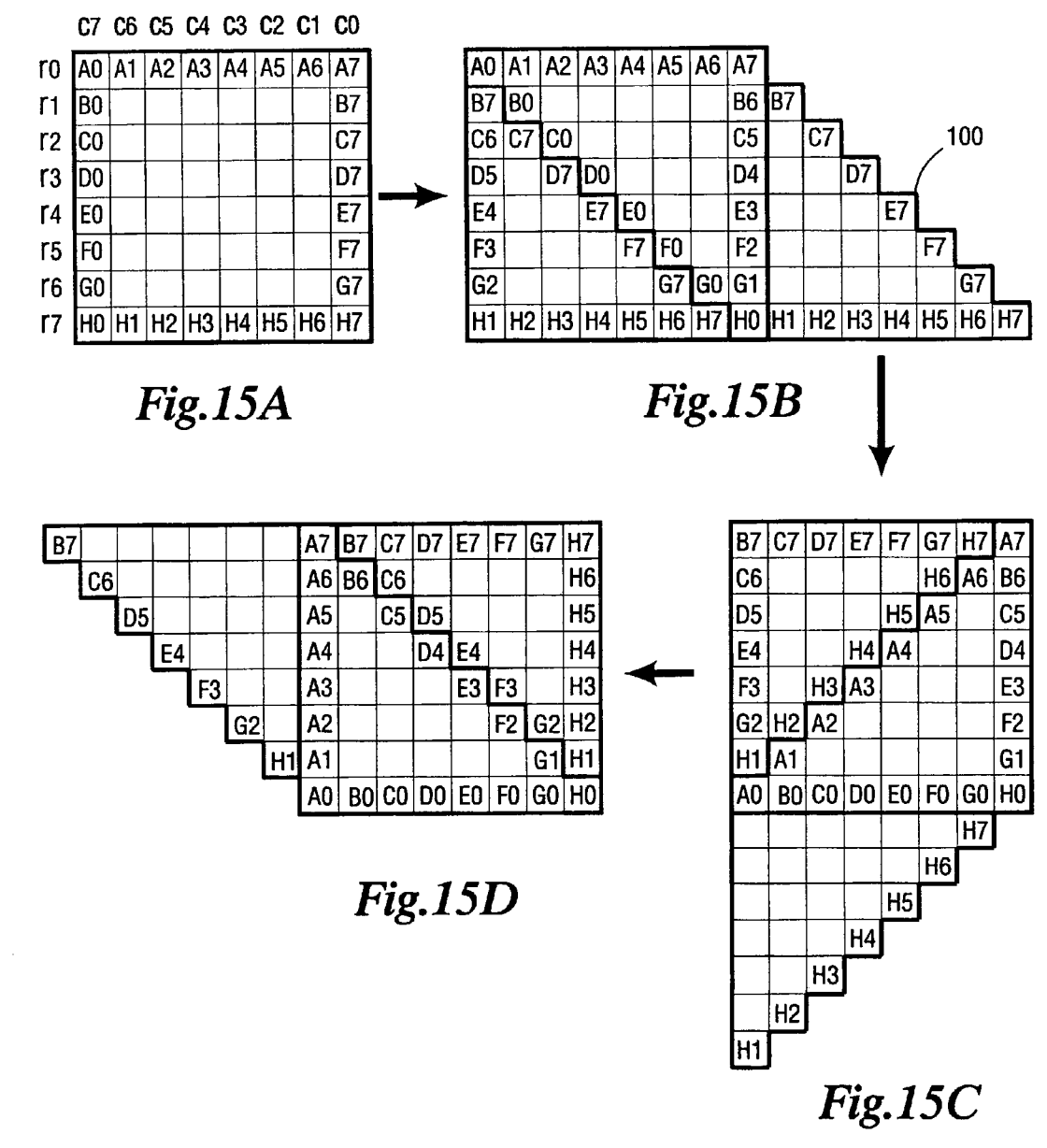

Turning now to FIGS. 15A through 15D, one embodiment of the present invention for implementing a three-shears method of rotating a matrix is illustrated. In FIG. 15A, a two-dimensional array of data is illustrated. A right wrap shift is performed on the data illustrated in FIG. 15A in a manner such that the top row of data, r0, remains fixed while each row thereunder is shifted from west to east. The data in row r1 is shifted west to east by one position, row r2 by two positions, etc. while the data in row r7 is shifted west to east by seven positions. Because the PEs are physically constrained in the array configuration, the data simply wraps around. However, if the PEs were not physically constrained, a first shear in an eastern direction would be performed as shown by the phantom portion 100.

The data in FIG. 15B is then subjected to a north to south shift with the data in the end column, c0, being fixed and the shift incremented by one position per column as you move from right to left in the figure. Thus, the data in column c1 is shifted north to south one position, the data in column c2 is shifted north to south by two positions while the data in column c7 is shifted north to south by seven positions. Again, because the PEs are physically constrained to maintain their positions, the data simply wraps around. However, if the PEs were free to move, a shear in the southerly direction would be performed. As can be seen, a shear in the southern direction is perpendicular to the shear performed in the eastern direction.

Turning now to FIG. 15D, a left shift of data is performed, i.e., a wrap shift of data from east to west. The wrap shift performed in FIG. 15D is performed in a direction opposite to the wrap shift performed in FIG. 15B. In FIG. 15D, the bottom row, r7, remains fixed with each row above it having its data shifted. Thus, the data in row r6 is shifted to the left one position, row r5 is shifted to the left two positions, while the data in row r0 is shifted to the left seven positions. Because the PEs are physically constrained, the data simply wraps around for each row. However, if the PEs were free to move, it is seen that a shear in the east to west direction would be performed.

Examining the data in the array of FIG. 15D, it is seen that the data in row r0 is the same as the data in column c0 of FIG. 15A, the data in column c7 of FIG. 15D is the same as the data in row r0 of FIG. 15A, the data in row r7 of FIG. 15D is the same as the data in column c7 of FIG. 15A, and the data in column c0 of FIG. 15D is the same as the data in row r7 of FIG. 15A. Thus, it is seen that the data in FIG. 15D is rotated 90° counterclockwise with respect to the data of FIG. 15A. The shifting and storing of data in the various steps illustrated in FIG. 15A through FIG. 15D can be controlled through the use of either local counters or a plurality of row and column select signals as previously described.

FIGS. 16A through 16D illustrate another embodiment of the present invention. In FIG. 16A, an array of data is illustrated. In FIG. 16B, a wrap shift has been performed with the row r3 fixed. The data in rows above row r3 are subjected to a left wrap shift while the data in the rows below r3 are subjected to a right wrap shift. Although physically the data wraps around each row, if the rows could physically shift, the array of data would appear as shown by the phantom portions 102 and 104. Thus, in FIG. 16B it is seen that a shear has been performed in a pair of directions, namely east and west.

In FIG. 16C, vertical shifts are performed about column c3. The data in columns to the right of column c3 are shifted in a northern direction while the data in columns to the left of column c3 are shifted in a southern direction. This enables a shear operation to be performed in a pair of directions, namely north and south, which are perpendicular to the directions in which the shear of FIG. 16B has been performed.

Turning now to FIG. 16D, another shear in the east-west direction is performed about row r4. That is, data in rows above row r4 are shifted to the left while data in rows below r4 are shifted to the right. Again, the data in each row wraps around. It can be seen by comparing the data in FIG. 16D with the data in FIG. 16A that the data in FIG. 16D is rotated 90° with respect to the data of FIG. 16A.

It will be seen from an examination of FIGS. 15A through 15D and 16A through 16D that the present invention is comprised of a plurality of shifting operations and a plurality of storing operations with the shifting and storing operations coordinated to enable a three shears operation to be performed on the data. The various storing operations required are performed in response to the processing elements' positions. Varying the combinations of directions as well as varying the amount of "phantom shear" (which could be positioned on either side or the top and bottom of the matrix of data) are contemplated by the present invention.

Although the figures illustrate a two-dimensional (2D) array connected as a mesh the present invention is applicable to other configurations. Accordingly, the phrase "plurality of processing elements" is to be broadly construed to include 2D and 3D collections of PEs connected in any known manner. For example, the PE's could be connected in shapes other than as illustrated in the figures, e.g., a cube. That would have f(x_Index, y_Index, z_Index). An n-dimensional hypercube would have n dimensions and f(d(0), d(1), d(2) . . . d(n−1)).

Additionally, the network need not be connected as a mesh. For example, a simple extension may be implemented by providing two extra connections, one to the PE halfway across the row and the other to the PE halfway down the column. For that example there would be two more shift connections. In addition to the North, East, South, and West shifts, there could also be Half_Row and Half Col shifts. Both of the above changes could be used at the same time. For example, a four dimensional hyper-cube with half-way connections would have twelve shift options.

While the present invention has been described in connection with a preferred embodiment thereof, those of ordinary skill in the art will recognize that many modifications and variations such as those previously discussed are possible. The present invention is not to be limited by the foregoing description but only by the following claims.

What is claimed is:

1. A method of rotating data in a plurality of processing elements connected in an array, comprising:
a first shifting of a plurality of data in a first direction along one of a row or a column until each processing element in each row or column has received data originally held by every other processing elements in that row or column, respectively;

a first selection of data from said received data, where each of the received data is a candidate for selection, in response to said first shifting and the positions of said plurality of processing elements;

a second shifting of said plurality of data in a second direction perpendicular to said first direction along one of a row or a column until each processing element in each row or column has received data originally held by every other processing elements in that row or column, respectively;

a second selection of data from said received data, where each of the received data is a candidate for selection, in response to said second shifting and the positions of said plurality of processing elements;

a third shifting of said plurality of data in a third direction opposite to said first direction along one of a row or a column until each processing element in each row or column has received data originally held by every other processing elements in that row or column, respectively; and a third selection of data from said received data, where each of the received data is a candidate for selection, in response to said third shifting and the positions of said plurality of processing elements.

2. The method of claim 1 wherein said first, second and third selection of data are responsive to initial counts which are either loaded into at least certain of said processing elements or calculated locally based on the processing element's location.

3. The method of claim 2 additionally comprising maintaining a current count in each processing element for each initial count, said current counts being responsive to said initial counts and the number of data shifts performed.

4. The method of claim 3 wherein said maintaining current counts includes altering said initial counts at programmable intervals by a programmable amount.

5. The method of claim 4 wherein said initial counts are decremented in response to a shifting of data to produce said current counts.

6. The method of claim 5 wherein a selection operation is performed when a current count in a processing element is non-positive.

7. The method of claim 1 additionally comprising selecting which of said processing elements are active using a row select signal and a column select signal.

8. The method of claim 1, wherein:
said first shifting and selecting operations are coordinated to enable a first shear operation to be performed in said first direction;
said second shifting and selecting operations are coordinated to enable a second shear operation to be performed in said second direction; and
said third shifting and selecting operations are coordinated to enable a third shear operation to be performed in said third direction.

9. A method of rotating data in a plurality of processing elements connected in an array, comprising:

a first shifting of a plurality of data in a first pair of directions to enable each processing element in each row or column to receive the data originally held by every other processing element in that row or column, respectively;

a first selecting of data by said plurality of said processing elements in response to said first shifting and the positions of said plurality of processing elements, where each of the received data is a candidate for selection;

a second shifting of said plurality of data in a second pair of directions perpendicular to said first pair of directions to enable each processing element in each row or column to receive the data originally held by every other processing element in that row or column, respectively;

a second selecting of data by said plurality of processing elements in response to said second shifting and the positions of said plurality of processing elements, where each of the received data is a candidate for selection;

a third shifting of said plurality of data in said first pair of directions to enable each processing element in each row or column to receive the data originally held by every other processing element in that row or column, respectively; and a third selecting of data by said plurality of processing elements in response to said third shifting and the positions of said plurality of processing elements, where each of the received data is a candidate for selection.

10. The method of claim 9 wherein said first, second and third selecting of data are responsive to initial counts which are either loaded into at least certain of said processing elements or calculated locally based on the processing element's location.

11. The method of claim 10 additionally comprising maintaining a current count in each processing element for each initial count, said current counts being responsive to said initial counts and the number of data shifts performed.

12. The method of claim 11 wherein said maintaining current counts includes altering said initial counts at programmable intervals by a programmable amount.

13. The method of claim 12 wherein said initial counts are decremented in response to a shifting of data to produce said current counts.

14. The method of claim 13 wherein a selecting operation is performed when a current count in a processing element is non-positive.

15. The method of claim 9 additionally comprising selecting which of said processing elements are active using a row select signal and a column select signal.

16. The method of claim 9 wherein:
said first shifting and selecting operations are coordinated to enable a first shear operation to be performed in said first pair of directions;
said second shifting and selecting operations are coordinated to enable a second shear operation to be performed in said a second pair of directions; and
said third shifting and selecting operations are coordinated to enable a third shear operation to be performed in said first pair of directions.

* * * * *

UNITED STATES PATENT AND TRADEMARK OFFICE
CERTIFICATE OF CORRECTION

| | | |
|---|---|---|
| PATENT NO. | : 7,913,062 B2 | Page 1 of 1 |
| APPLICATION NO. | : 10/689390 | |
| DATED | : March 22, 2011 | |
| INVENTOR(S) | : Mark Beaumont | |

It is certified that error appears in the above-identified patent and that said Letters Patent is hereby corrected as shown below:

In column 10, line 67, in Claim 1, delete "one of a row or a column" and insert -- a plurality of rows or columns --, therefor.

In column 11, lines 9-10, in Claim 1, delete "one of a row or a column" and insert -- the plurality of rows or columns --, therefor.

In column 11, lines 19-20, in Claim 1, delete "one of a row or a column" and insert -- the plurality of rows or columns --, therefor.

In column 12, lines 1-2, in Claim 9, delete "directions" and insert -- directions along a plurality of rows and columns --, therefor.

In column 12, line 10, in Claim 9, delete "directions" and insert -- directions along the plurality of rows and columns --, therefor.

In column 12, line 19, in Claim 9, delete "directions" and insert -- directions along the plurality of rows and columns --, therefor.

Signed and Sealed this
Tenth Day of May, 2011

David J. Kappos
*Director of the United States Patent and Trademark Office*